UNITED STATES PATENT OFFICE.

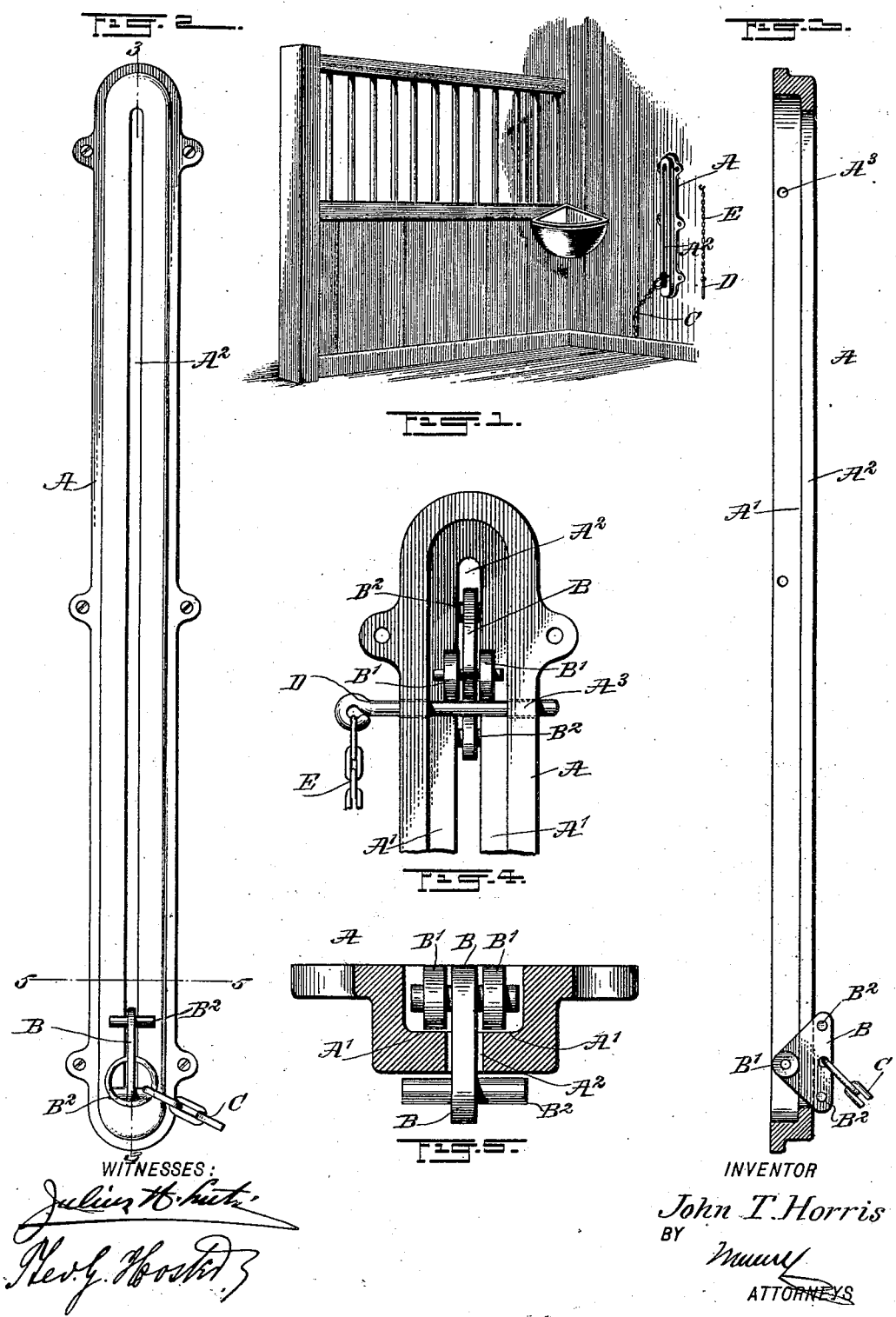

JOHN THOMAS HORRIS, OF NEW YORK, N. Y.

ANIMAL-TIE.

SPECIFICATION forming part of Letters Patent No. 694,279, dated February 25, 1902.

Application filed November 30, 1901. Serial No. 84,183. (No model.)

*To all whom it may concern:*

Be it known that I, JOHN THOMAS HORRIS, a citizen of the United States, and a resident of the city of New York, borough of Manhattan, in the county and State of New York, have invented certain new and useful Improvements in Animal-Ties, of which the following is a full, clear, and exact description.

The object of the invention is to provide a new and improved animal-tie more especially designed for use in horse-stalls and the like and arranged to allow the animal when tied perfect freedom in the movements of its head when lying down, rising, or standing up and without the slightest danger of becoming tangled up in the tying device.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the figures.

Figure 1 is a perspective view of the improvement as applied. Fig. 2 is an enlarged front elevation of the improvement. Fig. 3 is a sectional side elevation of the same on the line 3 3 of Fig. 2. Fig. 4 is an enlarged rear elevation of the upper end of the improvement, showing the carriage locked to the guideway; and Fig. 5 is a sectional plan view of the improvement on the line 5 5 of Fig. 2.

A guideway A, preferably made of metal, is disposed vertically and secured to the upper end of the stall in which it is to be used, and said guideway A is provided in its rear portion with tracks A', to which leads a slot $A^2$, formed in the front of the guideway and extending from near the top to near the bottom thereof, as is plainly illustrated in the drawings.

A carriage is mounted to travel on the guideway A, and said carriage consists, essentially, of a triangularly-shaped plate B, extending through the slot $A^2$ and carrying at its outer end the halter-chain C for connection with the halter of the animal to be tied in the stall.
On the inner corner of the plate B are journaled the friction-rollers B', traveling on the tracks A' and contained in the recessed rear portion of the guideway A, as is plainly shown in Figs. 4 and 5, and on the front corners of said plate B are arranged transverse pins $B^2$, adapted to travel on the outer face of the front of the guideway and serving to hold the plate B against inward movement.

It will be seen that by the arrangement described the carriage is free to travel up and down on the guideway A, so that the animal held by the halter and chain C to said carriage has perfect freedom in the movement of its head when lying down, when rising, or when standing up, it being understood that the carriage travels upward readily when the animal raises its head and readily travels downward by its own gravity when the animal lowers its head.

When the animal is standing up and it is desired to lock the carriage in an uppermost position, I provide a pin D, adapted to be inserted through apertures $A^3$ in the sides of the guideway A, as is plainly illustrated in Fig. 4. The carriage is lifted to an uppermost position previous to the insertion of the pin D, so that the lower edge of the plate B rests on said pin, and consequently supports the carriage in an uppermost position. The pin D may be hung on a suitable chain E, attached to the head of the stall, as indicated in Fig. 1. Friction-rollers may be arranged on the pins $B^2$, if desired.

The device is very simple and durable in construction, can be readily applied to the head of the stall, and properly supports the halter-chain at all times, so that the animal can be readily tied and untied.

Having thus described my invention, I claim as new and desire to secure by Letters Patent—

1. The combination with a guideway, of a movable carriage provided with projections arranged to ride against the front and rear of the guideway, and a halter connection on said carriage, as set forth.

2. The combination with a guideway, of a movable carriage fitted to said guideway and provided with means for attachment of a halter, and a locking device for holding the carriage in one position and against movement on said guideway, as set forth.

3. An animal-tie, comprising a fixed guideway having a vertical track in its rear portion and a slot in the front of the guideway and leading to said track, and a carriage having a body extending through the slot and carrying friction-rollers mounted to travel on said track, as set forth.

4. An animal-tie, comprising a fixed guideway having a vertical track in its rear portion and a slot in the front of the guideway leading to said track, a carriage having a body extending through the slot and carrying friction-rollers mounted to travel on said track, and a flexible halter connection attached to the front end of said body, as set forth.

5. An animal-tie, comprising a fixed guideway having a vertical track in its rear portion and a slot in the front of the guideway leading to said track, a plate extending through said slot, friction-rollers carried on the inner end of the plate and mounted to travel on said track, and a flexible connection for the front end of said plate to connect it with the halter, as set forth.

6. An animal-tie, comprising a fixed guideway having a vertical track in its rear portion and a slot in the front of the guideway leading to said track, a plate extending through said slot, friction-rollers carried on the inner end of the plate and mounted to travel on said track, a flexible connection for the front end of said plate to connect it with the halter, and pins held transversely in said plate at the front end thereof, to engage the front face of the guideway, as set forth.

In witness whereof I have signed my name to this specification in the presence of two subscribing witnesses.

JOHN THOMAS HORRIS.

Witnesses:
THEO. G. HOSTER,
EVERARD B. MARSHALL.